United States Patent [19]
Hoskins

[11] Patent Number: 4,789,377
[45] Date of Patent: Dec. 6, 1988

[54] UNIVERSAL JOINT

[76] Inventor: Nathan D. Hoskins, 6 Maywood Dr., Jackson, Tenn. 38301

[21] Appl. No.: 80,557

[22] Filed: Jul. 30, 1987

[51] Int. Cl.[4] .............................................. F16D 3/16
[52] U.S. Cl. ................... 464/157; 464/106; 464/170; 403/57
[58] Field of Search ................ 74/380, 385; 81/57.26, 81/177.7, 177.75; 403/57, 114, 115, 124; 433/109, 130; 464/73, 106, 109, 147, 149, 151, 157, 170, 177

[56] References Cited

U.S. PATENT DOCUMENTS

| | | | |
|---|---|---|---|
| Re. 22,555 | 10/1944 | Brooks | 464/157 X |
| 381,196 | 4/1888 | Winn | 74/385 |
| 478,811 | 7/1892 | Oehring | 464/151 |
| 636,476 | 11/1899 | Webster | 464/157 X |
| 1,241,118 | 9/1917 | Hoskins | 464/157 |
| 1,324,063 | 12/1919 | Noel | 464/157 |
| 1,421,072 | 6/1922 | Emet | 464/157 |
| 2,316,243 | 4/1943 | Hubbard | 464/157 X |
| 2,431,300 | 11/1947 | Quinn | 464/109 X |
| 2,496,871 | 2/1950 | Griffin | 74/380 |
| 2,584,097 | 1/1952 | Trbojevich | 464/157 X |
| 2,928,263 | 3/1960 | Devos | 464/157 X |
| 3,638,243 | 2/1972 | Campbell, Jr. et al. | 403/115 X |
| 4,492,488 | 1/1985 | Warshawsky | 403/115 X |
| 4,609,364 | 9/1986 | Labbe | 464/106 X |

FOREIGN PATENT DOCUMENTS 232421 8/1944 Switzerland ................ 464/109

Primary Examiner—Daniel P. Stodola
Attorney, Agent, or Firm—Young & Thompson

[57] ABSTRACT

A universal joint comprises a driving shaft and an angularly movable driven shaft. Each shaft comprises a cluster of axially interengaging gear teeth. Each gear tooth is semi-spherical, and each adjacent pair of gear teeth define a semi-spherical socket between them. A bearing ball is fixed to one or the other of the gear clusters, and comprises a circumferential array of part-spherical recesses adapted to receive the ends of the semi-spherical gear teeth on the shaft that does not support the bearing ball. The specially formed bearing ball and its associated gear cluster thus define a support and bearing structure that permits the gear teeth of each cluster to mesh smoothly and evenly over a range of angular movement of the movable gear of 0°–90°. The universal joint is provided with a slotted casing that permits the movable gear to assume this range of angular movement. The interior of the slotted casing is provided with differentiated bearing surfaces that provide sufficient clearance for the gear cluster of the movable gear to assume its range of angular movement, and support the movable gear over all of this range of movement.

5 Claims, 2 Drawing Sheets

UNIVERSAL JOINT

The present invention relates to universal joints, and more particularly to a rotary coupling capable of transmitting even very large driving forces from a driving shaft to a driven shaft, at any angle between the two shafts from 0° up to and including 90°.

Rotary couplings of the crown gear type are well known, in which each of a driving and driven shaft are provided with a crown of gear teeth. When the shafts are aligned, the crowns on the respective shafts intermesh axially; when the shafts are angularly offset, at least one of the gear teeth of one crown is always engaged between a pair of teeth on the other crown. In this manner, power may be transmitted from the driving shaft to the driven shaft from a position of alignment of the two shafts up to a maximum angular displacement of the two shafts. Couplings of this type are particularly prevalent in dental tools.

Couplings of this type are attended with the disadvantage that the particular shape of the teeth on each crown gear cluster limits the smoothness and efficiency of the transmission of power, and further limits the extent of angular displacement of the shafts through which the coupling is effective to operate.

U.S. Pat. No. 1,241,118 to Hoskins teaches a universal joint having two gears formed from semi-balls on the ends of two shafts. When the shafts are aligned, the two gears together describe an approximate sphere. The gear teeth in this patent are shaped as if cut along an undulating line extending circumferentially about this sphere. The gear teeth thus have a constant thickness radially of the sphere, and the inner and outer surfaces of the teeth form sharp edges with the adjacent radially extending side surfaces of the gear teeth. A radial section taken through the teeth of one of the gears would therefore show a circular array of trapezoidal sections. Hoskins discloses that the shafts are to be driven at an angle of preferably not more than 30°. Hoskins, like much of the prior art, mounts his gears in a hinged casing; the hinged casing serves to maintain the teeth of each gear in correct position relative to one another. Specifically, in order for the gears to mesh and transmit smoothly, the extent of penetration of each gear tooth between the corresponding pair of adjacent teeth on the other crown must be carefully controlled. This is particularly true when the shafts are angularly offset from one another, wherein absent any means for positioning the gear clusters relative to one another, the teeth of one gear would penetrate too far between the corresponding pairs of adjacent teeth on the other gear cluster, which would result in a rough transmission of power, if not outright jamming of the coupling.

Other examples of hinged casings used to correctly position the gear clusters of axially intermeshing crown gear couplings are provided in U.S. Pat. Nos. 636,476, 2,316,243 and U.S. Pat. No. Re. 22,555. The requirement of a hinged casing, however, greatly restricts the possible applications of a coupling so equipped; when the shafts are angularly offset the casing is open, and the gear teeth are thus exposed to the ambient environment outside the casing. This enables foreign material to enter the casing and to impede the smooth and correct meshing and transmission of the gear teeth. A hinged casing also makes the rotary coupling more complicated and expensive to manufacture, and creates the disadvantage of additional moving parts in the coupling.

The object of the present invention is to overcome the disadvantages discussed above.

More specifically, the present invention has as an object the provision of a rotary coupling in which each of two shafts is provided with a cluster of specially-shaped gear teeth, which enable power to be transmitted from one shaft to the other smoothly and efficiently over an angular range of 0°–90°.

The present invention has as a further object the provision of a rotary coupling in which the gear teeth of each respective gear cluster are continuously maintained correctly positioned relative to one another, without the need for a hinged casing.

These and other objects of the present invention will become apparent from a reading of the following detailed description of preferred embodiments, given by way of non-limiting example, and taken in conjunction with the accompanying drawings, in which.

Figure 1:
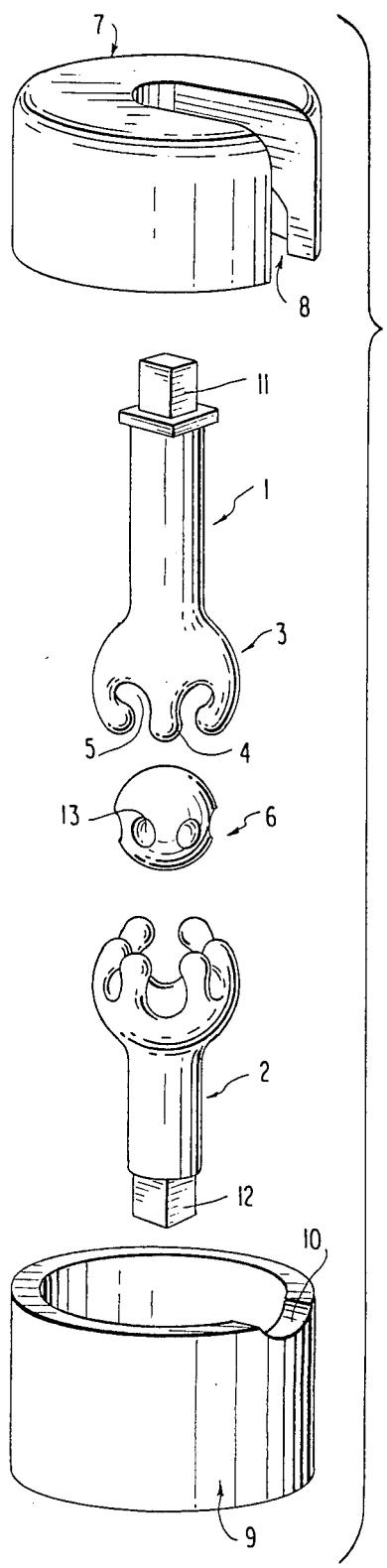
FIG. 1 is an exploded perspective view showing the principal components of the present invention.

Referring now to FIG. 1, the universal joint according to the present invention comprises a drive shaft 2 and an angularly movable driven shaft 1. Each of these shafts 1 and 2 comprises a semi-ball shaped gear cluster 3. Each gear cluster 3 in turn comprises a circular array of ball-like gear teeth 4 and a corresponding circular array of ball-like sockets 5 each formed between adjacent pairs of teeth 4. A radial section taken through the teeth 4 of either gear cluster 3 would therefore show a circular array of circular sections.

Naturally, the maximum diameter of each tooth 4 must be less than the minimum clearance between each pair of adjacent teeth 4, in order to allow angular movement of shafts 1 and 2.

Each gear cluster 3 defines a hemispherical seat 22 (see FIG. 2), which seat 22 is adapted to receive a bearing ball 6. The bearing ball 6 is fixed to the hemispherical seat 22 of one or the other of shafts 1 and 2. The bearing ball 6 comprises a circumferential array of part-spherical recesses 13, which recesses 13 are adapted to be positioned between adjacent pairs of teeth 4 on the shaft on which it is mounted, and to receive and act as a bearing surface for the ends of the teeth 4 of the other shaft when shafts 1 and 2 are angularly offset relative to one another. Thus, when the shafts 1 and 2 are aligned, bearing ball 6 acts as a conventional axial thrust bearing; when shafts 1 and 2 are angularly offset, however, as shown in FIG. 2, the part-spherical recesses 13 of bearing ball 6, mounted on shaft 1, serve as a bearing surface for the ends of the teeth 4 of shaft 2, thereby also limiting the extent of penetration of teeth 4 on shaft 2 radially inwardly between adjacent teeth 4 on shaft 1.

The universal joint according to the invention also comprises a casing 7, 9. The upper half 7 of this casing comprises a slot 8 beginning at the central upper surface of this casing half, and extending all the way down the side thereof. The lower casing half 9 comprises a part-cylindrical cut-out 10, for receiving the cylindrical shank of movable shaft 1 when shafts 1 and 2 are offset 90°.

Shafts 1 and 2 have squared distal ends 11 and 12, respectively, for easy attachment to other driven and driving members, not shown.

Figure 2:
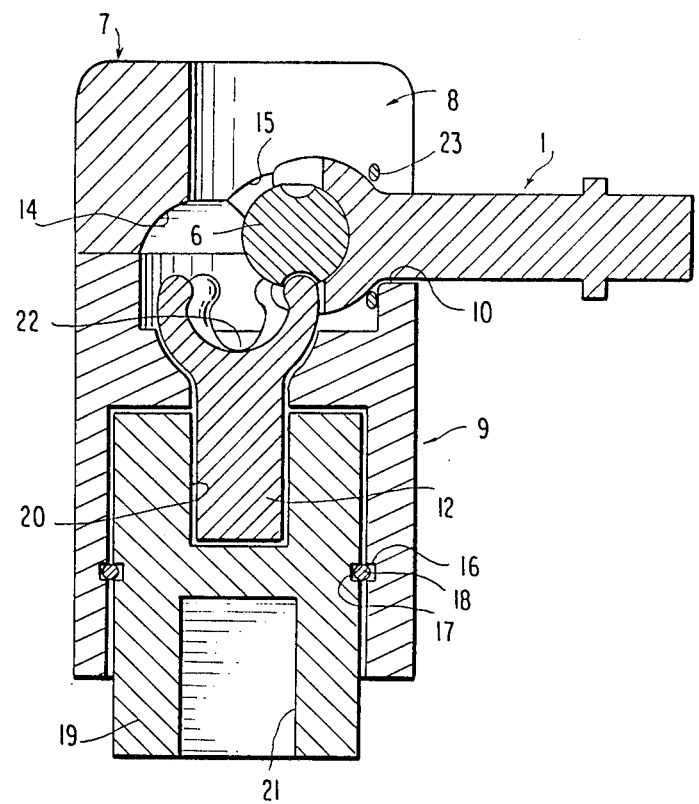
FIG. 2 is a longitudinal sectional view of the assembled universal joint, shown in the position of 90° power transmission.

Referring now to FIG. 2, it will be seen that the lower casing half 9 comprises a cylindrical opening at its lower end to receive a cylindrical drive attachment 19. The cylindrical drive attachment 19 comprises an upper square socket 20 for receiving the square end 12 of shaft 2, and a lower square socket 21 for attachment to a driving member (not shown). The cylindrical drive attachment 19 is secured in the lower casing half 9 by a locking ring 18, which locking ring 18 is fitted into an interior circumferential groove 16 formed in the lower opening of the lower casing half 9, and a corresponding exterior circumferential groove 17 formed on the cylindrical drive attachment 19.

FIG. 2 illustrates the gear teeth-positioning means according to the invention. This sectional view shows one of the gear teeth 4 of the drive shaft 2 positioned in the corresponding socket 5 formed between two adjacent teeth 4 on driven shaft 1. The extent of penetration of the gear teeth 4 between the corresponding adjacent pair of teeth on shaft 1 is limited by the part-spherical recess 13 which is centered between this pair of teeth on the shaft 1 to which it is affixed. In FIG. 2, the shafts 1 and 2 are also positioned by the shaft 1 resting in the part cylindrical cut-out 10; it will be recognized, however, that when the shafts 1 and 2 are offset at an angle intermediate 0° and 90°, the extent of interpenetration of the teeth on the drive shaft 2 between the teeth on the drive shaft 1 will be limited solely by the bearing ball 6 with its part-spherical bearing recesses 13.

It will be appreciated that the slot 8 in the upper casing half 7 is slightly wider than the cylindrical shank of shaft 1, but narrower than the semi-spherical gear cluster 3, in order to retain the shaft 1 in the casing. FIG. 2 (as well as FIG. 3) thus also shows the requisite interior contour of the upper casing half 7, that permits the shaft 1 to assume its full range of angular movement, and also provides a continuous bearing surface for the shaft 1 over its full range of angular movement. Specifically, when shafts 1 and 2 are aligned, the semi-spherical gear cluster 3 of shaft 1 will bear against the zero angle bearing surface 14 of the upper casing half 7, through the intermediary of an undulate spring 23. This undulate spring 23 urges the teeth of shafts 1 and 2 into meshing engagement. If bearing surface 14 extended continuously around the interior of the upper casing half 7, however, there would be no clearance for shaft 1 to be angularly displaced. On that side of casing half 7 where slot 8 is formed, therefore, bearing surface 14 is enlarged to form angular bearing surface 15. Both of bearing surfaces 14 and 15 are substantially part spherical, but it will be appreciated that the center of the sphere describing bearing surface 15 is displaced, with respect to FIGS. 2 and 3, upwardly and to the right of the center of the sphere describing bearing surface 14. Notice also in this regard that upper casing half 7 is symmetrical about a plane bisecting slot 8, and thus the centers of the spheres describing bearing surfaces 14 and 15 both lie in this plane of symmetry. Of course, bearing surface 15 is interrupted in its middle portion by the slot 8. From FIGS. 2 and 3 and the above description, therefore, it will be clear that at least some portion of undulate spring 23 bears against some portion of bearing surfaces 14 and/or 15 continuously throughout the range of angular movement of movable gear 1.

Figure 3:
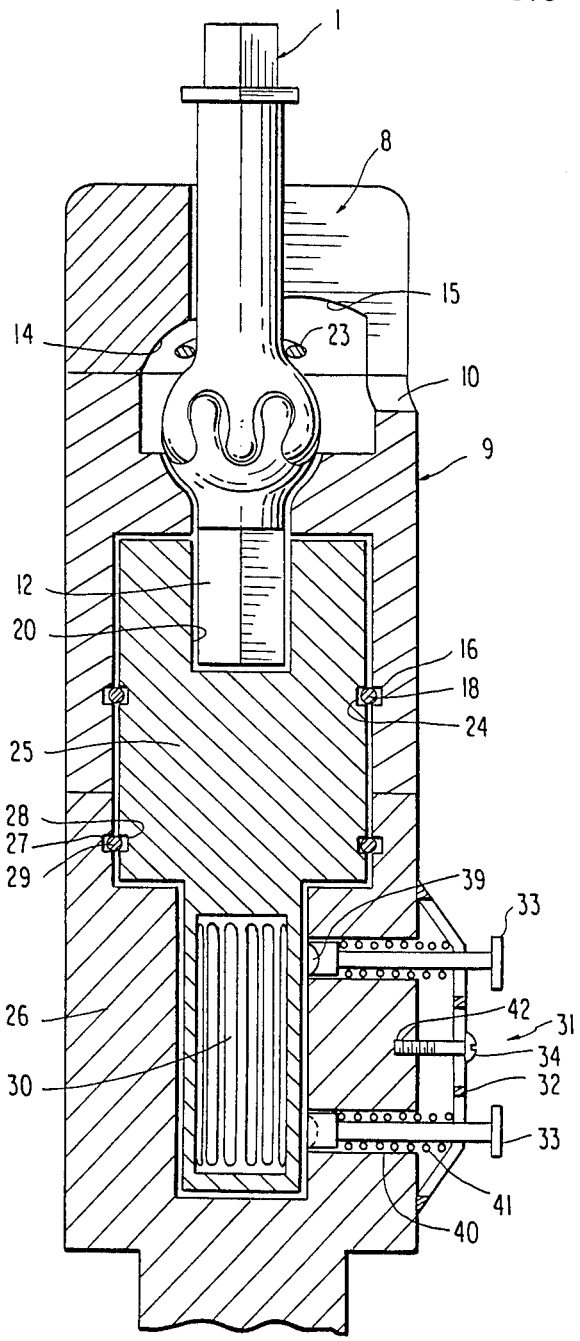
FIG. 3 is a longitudinal sectional view of the universal joint according to the present invention, shown with the gears in their straight-line position, and also showing a two-way ratchet mechanism for the drive gear.
Figure 4:
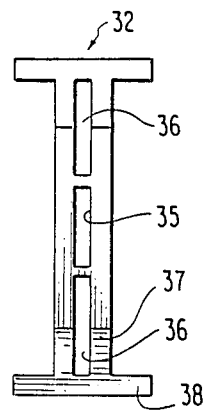
FIG. 4 is a front view of the wedge-shaped plate used in the ratchet mechanism of FIG. 3.

FIGS. 3 and 4 illustrate an alternative embodiment according to the invention, in which the cylindrical drive attachment 19 of FIG. 2 is replaced by a ratcheted drive attachment 25 and a ratchet handle 26 with associated ratchet mechanism 31 is attached to the distal end of lower casing half 9.

Notice that in FIG. 3, the movable and fixed shafts 1 and 2 are not shown in section, in order better to illustrate the axial intermeshing of the gear clusters 3. Additionally, ratchet pins 33 are not shown in section in this figure, in order better to illustrate their oppositely disposed, wedge-shaped ends 39.

Ratchet handle 26 is rotatable relative to lower casing half 9; upper casing half 7, however is attached to lower casing half 9 by any known means, for example by welding. The same is true for the attachment of casing halves 7 and 9 throughout the drawing figures. Ratchet handle 26 comprises an upper cylindrical opening that is narrowed to a narrower central cylindrical opening. The upper, wider cylindrical opening of ratchet handle 26 comprises an interior circumferential groove 27, which, along with lower exterior circumferential groove 28 of the ratcheted drive attachment 25, receives a locking ring 29. Ratcheted drive attachment 25 additionally comprises an upper exterior circumferential groove 24, corresponding to groove 17 of cylindrical drive attachment 19 in FIG. 2.

The ratchet drive attachment 25 has a narrow cylindrical portion comprising a circumferential array of elongated, axially extending slots 30. A pair of channels 40 communicates the narrow cylindrical recess of ratchet handle 26 with its exterior. The ratchet mechanism according to this embodiment is indicated generally at 31. It comprises a wedge-shaped plate 32, a screw 34 and a pair of ratchet pins 33. The wedge-shaped plate 32 comprises slots 36 through which the heads of ratchet pins 33 pass. A coil spring 41 is confined on the shank portion of each of the ratchet pins 33. The coil spring bears against the wedge-shaped ends 39 of the pins 33 on the one hand, and against the inside surface of the plate 32 on the other hand. The coil springs must therefore have a diameter greater than the width of the slots 36. The screw 34 passes through an oblong screw opening 35 in plate 32, and is received in threaded bore 42 formed in the ratchet handle 26. The shank of ratchet pins 33 is preferably rectangular, and sized so as to prevent ratchet pins 33 from rotating about their axis within slots 36. Each ratchet pin 33 comprises a wedge-shaped end 39, but as shown in FIG. 3, these wedge-shaped ends are oppositely disposed in the channels 40.

FIG. 3 shows the ratchet mechanism 31 in its neutral position, with screw 34 centered in oblong screw opening 35. The head of screw 34 must obviously have a diameter greater than the width of the oblong opening 35. When it is desired to establish a ratcheting connection between ratchet handle 26 and ratcheted drive attachment 25, it is necessary first to loosen screw 34, then to slide plate 32 either upward or downward relative to the orientation shown in FIG. 3, and then to retighten screw 34. As shown in FIG. 3, springs 41 are unbiased. Feet 38 of wedge-shaped plate 32 establish sliding contact between plate 32 and the outer surface of ratchet handle 26. When plate 32 is slid downwardly, upper spring 40 will slide along and be compressed by the interior surface of inclined portion 37 of plate 32. The compression exerted on upper spring 40 by this inclined portion 37 will urge the wedge-shaped end 39 of this upper pin 33 into one of the elongated slots 30. With reference to FIG. 3, therefore, when plate 32 is slid to its lowermost position, the upper ratchet pin 33 will be engaged in the elongated slots 30, and the ratchet handle 26 may be driven to the right in FIG. 3 and will transmit this driving force to ratcheted drive attachment 25. If, however, ratchet handle 26 is driven to the left, ratcheted drive attachment 25 will remain stationary owing to the orientation of the wedge-shaped end 39 of the upper ratchet pin 33. Conversely, when wedge-shaped plate 32 is slid to its uppermost position, the oppositely disposed wedge-shaped end 39 of the lower pin 40 wil be engaged in the elongated slots 30, and driving force can be transmitted from the ratchet handle 26 to the ratcheted drive attachment 25 only by rotating ratchet handle 26 to the left as shown in FIG. 3.

It will be understood that the present invention is not limited to the embodiments described and shown above. Modifications remain possible, particularly from the point of view of substitution of equivalent components or techniques, without departing whatsoever from the scope and spirit of the present invention.

What is claimed is:

1. A universal joint comprising: a drive shaft and a driven shaft movable relative to said drive shaft over an angular range of 0°-90°; each of said drive and driven shafts comprising a hemispherical crown gear cluster at one end thereof, and a distal end; each said gear cluster comprising a circular array of hemispherical gear teeth; each adjacent pair of said gear teeth defining a ball-like socket between said each adjacent pair; each said circular array of said gear teeth defining a central hemispherical seat formed in the corresponding said gear cluster; a bearing means fixed in the said hemispherical seat of one of said drive and driven shafts receiving said gear teeth of said other of said drive and driven shafts and providing a bearing surface therefor when said shafts are angularly offset; and a closed casing enclosing said gear clusters of said drive and driven shafts, said gear clusters being maintained in meshing engagement within said casing; said casing maintaining said drive shaft rotatably and non-displaceably mounted therein and exposing said distal end of said drive shaft for connection to a driving means; said casing comprising a slot defining a 90° range of angular movement of said driven shaft relative to said drive shaft, said distal end of said driven shaft extending outside said casing through said slot; said gear cluster of said driven shaft being rotatably and axially displaceably confined within said casing; said casing further comprising differentiated spherical bearing surfaces coextensive with said slot, said bearing surfaces supporting said gear cluster of said driven shaft and providing clearance for said driven shaft to move over all of said angular range.

2. Universal joint according to claim 1, wherein said joint further comprises an undulate spring disposed on said driven shaft and confined between said gear cluster of said driven shaft and said interior bearing surfaces.

3. Universal joint according to claim 1, wherein said bearing means comprises a bearing ball having a circumferential array of part-spherical recesses, each said part-spherical recess being disposed intermediate a pair of adjacent said gear teeth on the said gear cluster to which it is fixed.

4. Universal joint according to claim 1, and further comprising a ratchet mechanism cooperating with said drive shaft, said ratchet mechanism comprising means for selectively driving said drive shaft in each of opposite directions of rotation.

5. Universal joint according to claim 1, wherein said differentiated spherical bearing surfaces comprise a first bearing surface describing a portion of a sphere having its center aligned with the axis of rotation of said drive shaft, and a second bearing surface describing a portion of a sphere having its center displaced upwardly and radially outwardly, relative to said drive shaft, from the center of the sphere described by the said first bearing surface, both said sphere centers being contained in a same plane bisecting said slot of said casing, said second bearing surface being interrupted by said slot.

* * * * *